(12) United States Patent  
Otake et al.

(10) Patent No.: US 8,829,817 B2  
(45) Date of Patent: Sep. 9, 2014

(54) POWER SUPPLY DEVICE AND LIGHTING EQUIPMENT

(71) Applicants: Toshiba Lighting & Technology Corporation, Yokosuka (JP); Kabushiki Kaisha Toshiba, Tokyo (JP)

(72) Inventors: Hirokazu Otake, Yokosuka (JP); Mitsuhiko Nishiie, Yokosuka (JP); Takuro Hiramatsu, Yokosuka (JP); Keiichi Shimizu, Yokosuka (JP)

(73) Assignees: Toshiba Lighting & Technology Corporation, Kanagawa (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/687,973

(22) Filed: Nov. 28, 2012

(65) Prior Publication Data

US 2013/0088173 A1 Apr. 11, 2013

Related U.S. Application Data

(63) Continuation of application No. 12/873,744, filed on Sep. 1, 2010, now Pat. No. 8,354,804, which is a continuation of application No. PCT/JP2009/055871, filed on Mar. 24, 2009.

(30) Foreign Application Priority Data

Mar. 24, 2008 (JP) .................................. 2008-076835

(51) Int. Cl.
| | |
|---|---|
| H05B 37/02 | (2006.01) |
| H05B 33/08 | (2006.01) |
| H02M 1/00 | (2006.01) |
| H02M 3/335 | (2006.01) |

(52) U.S. Cl.
CPC ....... *H05B 37/02* (2013.01); *H02M 2001/0025* (2013.01); *H02M 3/33507* (2013.01); *H05B 33/0848* (2013.01); *H05B 33/0815* (2013.01); *H05B 33/0803* (2013.01); *Y02B 20/347* (2013.01)
USPC ...................... 315/308; 315/209 R

(58) Field of Classification Search
USPC ................... 315/209 R, 219, 291, 307, 308
See application file for complete search history.

(56) References Cited

U.S. PATENT DOCUMENTS 5,498,995 A * 3/1996 Szepesi et al. ................ 327/538
6,456,051 B2 * 9/2002 Darzy ........................... 323/284

(Continued)

FOREIGN PATENT DOCUMENTS

| EP | 1608206 | 12/2005 |
| EP | 1689212 | 8/2006 |

(Continued)

OTHER PUBLICATIONS

U.S. Appl. No. 12/885,053.

(Continued)

*Primary Examiner* — Thuy Vinh Tran
(74) *Attorney, Agent, or Firm* — DLA Piper LLP (US)

(57) ABSTRACT

In a power supply device according to one embodiment, a reference signal (Vref1), which changes from a value corresponding to a maximum current in a full lighting state to that corresponding to a minimum current in case of a deepest dimming depth, and a reference signal (Vref2), which changes from a value corresponding to a load voltage at the time of a maximum current in a full lighting state to that corresponding to a minimum current in case of the deepest dimming depth, are prepared in accordance with dimming depths of a dimming signal. In a shallow dimming depth region close to a full lighting state, the reference signal (Vref1) is selected to apply constant-current control to light-emitting diodes in a current control mode. In a deep dimming depth region, the reference signal (Vref2) is selected to apply constant-voltage control to the diodes in a voltage control mode.

8 Claims, 11 Drawing Sheets

(56) References Cited

U.S. PATENT DOCUMENTS

| | | | |
|---|---|---|---|
| 6,747,420 B2 * | 6/2004 | Barth et al. ................ | 315/291 |
| 6,787,999 B2 | 9/2004 | Stimac | |
| 7,038,399 B2 * | 5/2006 | Lys et al. .................. | 315/291 |
| 7,102,340 B1 | 9/2006 | Ferguson | |
| 7,262,559 B2 | 8/2007 | Tripathi | |
| 7,327,098 B2 | 2/2008 | Chen | |
| 7,750,579 B2 * | 7/2010 | Aiello ...................... | 315/247 |
| 7,855,520 B2 * | 12/2010 | Leng ........................ | 315/307 |
| 8,076,920 B1 | 12/2011 | Melanson | |
| 8,125,159 B2 * | 2/2012 | Aiello ...................... | 315/274 |
| 2006/0001381 A1 | 1/2006 | Robinson | |
| 2006/0022916 A1 | 2/2006 | Aiello | |
| 2006/0071614 A1 | 4/2006 | Tripathi | |
| 2006/0119181 A1 | 6/2006 | Namba | |
| 2006/0170370 A1 | 8/2006 | De Anna | |
| 2007/0183173 A1 | 8/2007 | Wu | |
| 2008/0238387 A1 | 10/2008 | Schmeller | |
| 2009/0189546 A1 * | 7/2009 | Chang Chien et al. ....... | 315/307 |
| 2010/0213845 A1 | 8/2010 | Aiello | |

FOREIGN PATENT DOCUMENTS

| | | |
|---|---|---|
| JP | 09-251899 | 9/1997 |
| JP | 2002-231471 | 8/2002 |
| JP | 2003-157986 | 5/2003 |
| JP | 2007-042758 | 2/2007 |
| JP | 2008-504654 | 2/2008 |
| JP | 2008-310963 | 12/2008 |
| RU | 2005120489 A | 6/2005 |

OTHER PUBLICATIONS

U.S. Appl. No. 12/557,179.
English Language Abstract of JP 2003-157986 Published May 30, 2003.
English Language Translation of JP 2003-157986 Published May 30, 2003.
English Language Abstract of JP 2008-310963 Published Dec. 25, 2008.
English Language Translation of JP 2008-310963 Published Dec. 25, 2008.
International Search Report issued in PCT/JP2009/055871 on Jun. 9, 2009.
English Language Abstract of JP 2002-231471 Published Aug. 15, 2002.
English Language Translation of JP 2002-231471 Published Aug. 15, 2002.
Japanese Office Action issued in JP 2008-076835 on Aug. 24, 2010.
English Translation of Japanese Office Action issued in JP 2008-076835 on Aug. 24, 2010.
U.S. Appl. No. 12/860,528.
U.S. Appl. No. 12/873,744.
U.S. Appl. No. 12/873,759.
International Preliminary Report on Patentability and Written Opinion mailed Nov. 18, 2010 in PCT/JP2009/055871.
Japanese Office Action issued in JP 2010-235474 on Apr. 19, 2012.
English Language Translation of Japanese Office Action issued in JP 2010-235474 on Apr. 19, 2012.
English Language Abstract of JP 2008-504654 published Feb. 14, 2008.
English Language Translation of JP 2008-504654 published Feb. 14, 2008.
Japanese Office Action issued in JP 2010-235473 mailed Jul. 19, 2012.
English Language Translation of Japanese Office Action issued in JP 2010-235473 mailed Jul. 19, 2012.
English Language Abstract of JP 2007-042758 published Feb. 15, 2007.
English Language Translation of JP 2007-042758 published Feb. 15, 2007.
Supplementary European Search Report issued in EP 09725738 on Aug. 17, 2012.
U.S. Appl. No. 13/776,409.
Russian Office Action issued in 2010136955 on Dec. 12, 2013.
English Language Translation of Russian Office Action issued in 2010136955 on Dec. 12, 2013.
English Language Abstract of RU 2313135 C2 published on Dec. 20, 2005 (Corresponds to RU 2005120489 published Jun. 30, 2005).
English Language Abstract and Translation of JP 09-251899 published on Sep. 22, 1997.
U.S. Appl. No. 12/874,282.
U.S. Appl. No. 12/777,303.
U.S. Appl. No. 12/764,995.
U.S. Appl. No. 12/873,348.

* cited by examiner

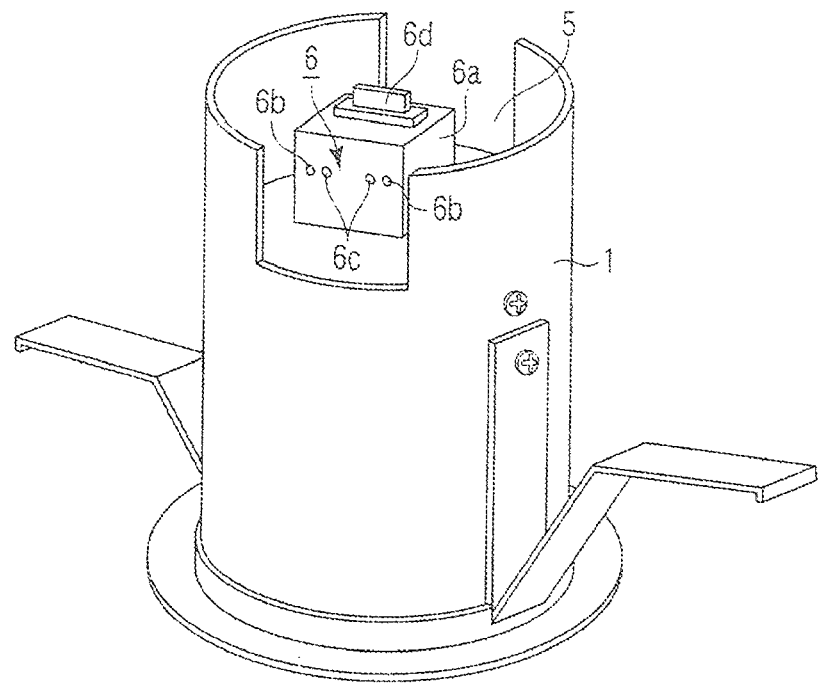
F I G. 1
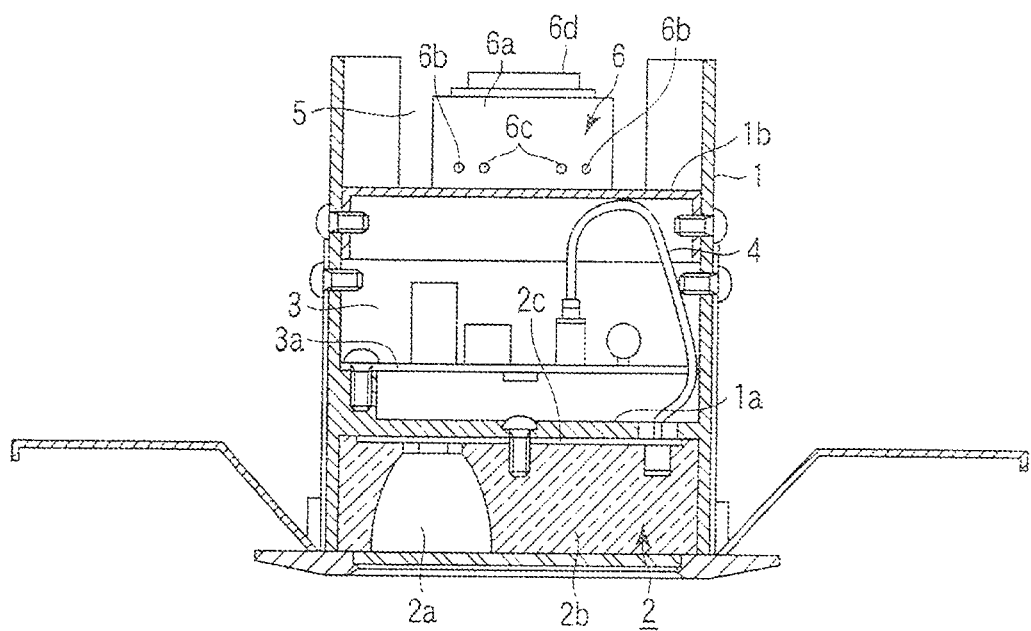
F I G. 2

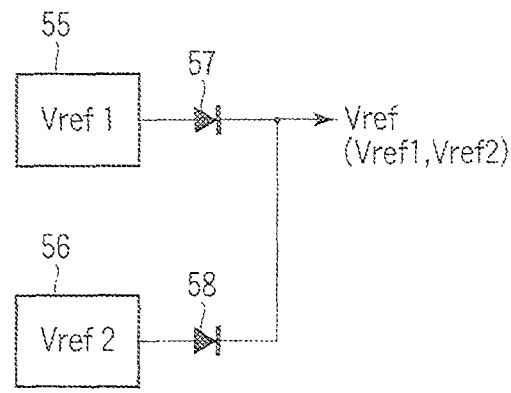
F I G. 9A
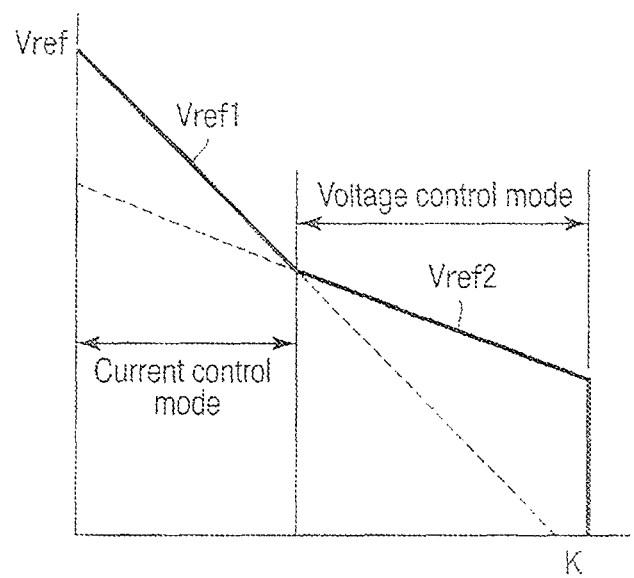
F I G. 9B

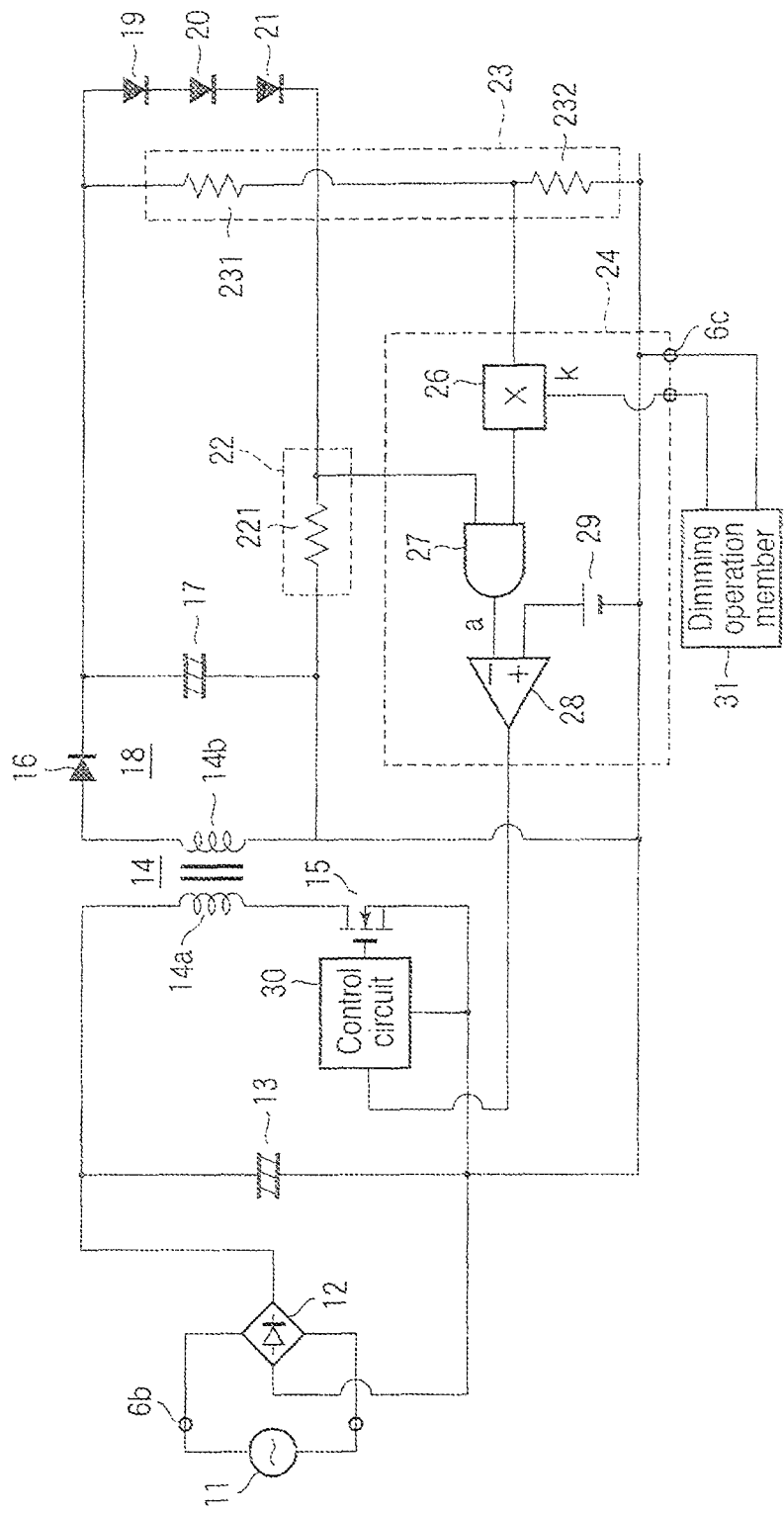
F I G. 12

POWER SUPPLY DEVICE AND LIGHTING EQUIPMENT

CROSS-REFERENCE TO RELATED APPLICATIONS

This is a Continuation Application of U.S. application Ser. No. 12/873,744, filed on Sep. 1, 2010, which is now U.S. Pat. No. 8,354,804. U.S. application Ser. No. 12/873,744 is a Continuation Application of PCT Application No. PCT/JP2009/055871, filed Mar. 24, 2009, which claims the benefit of priority from Japanese Patent Application No. 2008-076835, filed Mar. 24, 2008. The entirety of all of the above-listed applications are incorporated herein by reference.

FIELD

Embodiments described herein relate generally to a power supply device and a lighting equipment, which have a dimming function for driving a semiconductor light-emitting element such as a light-emitting diode.

BACKGROUND

Recently, power supply devices which switch DC power using switching elements are popularly used for driving semiconductor light-emitting elements such as light-emitting diodes. These power supply devices include a dimming function for controlling the amount of light emitted by a light-emitting diode in accordance with an externally input dimming signal.

Conventionally, as disclosed in, e.g., JP-A 2003-157986 (KOKAI), a power supply circuit includes both a voltage dimming Circuit that controls an applied voltage to a light-emitting diode, and a duty dimming circuit that switches on and off the applied voltage to the light-emitting diode. A dimming control signal controls switching between the voltage dimming circuit and duty dimming circuit.

In the power supply circuit disclosed in JP-A 2003-157986 (KOKAI), dimming control is carried out based on a pulse width. Therefore, the light output from the light-emitting diode may flicker. Also, a switch element connected in series or parallel to the light-emitting diode is required in addition to a current-limiting element for output current control based on the pulse width control. Therefore, the number of components of the power supply circuit is increased, and the efficiency of the power supply circuit drops.

However, since a light-emitting diode exhibits nearly constant voltage characteristics, a component or circuit having a current-limiting element is required to stably light on the light-emitting diode. In general, when the light-emitting diode is controlled by a power supply device using a switching element, current control is adopted. This current control is an important control element in design of a lighting device since the temperature of the light-emitting diode is decided by a current value to be supplied to the light-emitting diode, and it influences a service life of the element.

Dimming the light-emitting diode is relatively easily attained compared to a conventional electric discharge lamp lighting device. This is based on the fact that the light-emitting diode as a load has electrically stable characteristics, and suffers less variations of its characteristics against an external factor such as a temperature. However, when constant current control is adopted in an application that requires deep dimming, the light-emitting diode can be stably lighted in a region with a large full lighting current, but a current detection signal or a current reference value required to control this current detection signal becomes a very low signal in a deep dimming region. Therefore, a detection circuit or comparator, which detects a current, is required to have high precision, and it becomes difficult to attain stable operation due to high susceptibility to noise. Hence, a signal voltage required for control may be increased. However, in general, a current detection signal is detected by a resistor inserted in series to the light-emitting diode, and consumption power and heat generation amounts by this resistor increase in a region where a current flowing through the light-emitting diode is large, thus disturbing development of the power supply device.

As a proposal which solves these problems, a method of constant-controlling an output voltage has been proposed. For example, an ON voltage of a light-emitting diode is higher than that of a general silicon diode. For example, in a GaN diode represented by a blue light-emitting diode, current begins to flow from about 2.5 V, and a full lighting state requires a voltage as low as about 3.5 to 4.5 V. Even for deep dimming, relatively stable dimming can be attained without being influenced by the performance of the light-emitting diode or noise. However, since a forward voltage of the light-emitting diode has negative temperature characteristics, the light-emitting diode is self-heated by a flowing current. As a result, since the forward voltage lowers and a current further increases, a heat generation amount may become larger, thus causing thermal runaway. Also, light-emitting diodes have large variations, and output currents vary due to individual differences of light-emitting diodes even when the output of a lighting device is adjusted. This problem is posed similarly in a dimmed state in addition to a full lighting state. As a result, the currents flowing through light-emitting diodes vary, resulting in variations of light outputs.

BRIEF DESCRIPTION OF THE DRAWINGS

FIG. 1 is a schematic perspective view showing a lighting equipment having a power supply device according to the first embodiment;

FIG. 2 is a schematic sectional view showing the internal structure of the lighting equipment shown in FIG. 1;

FIG. 9A is a circuit block diagram showing a reference signal output unit in a power supply circuit according to a modification of the power supply device shown in FIG. 7;

FIG. 9B is a graph for explaining reference signals output from the reference signal output unit shown in FIG. 9A;

FIG. 12 is a schematic circuit diagram showing a power supply circuit of a power supply device according to another embodiment;

DETAILED DESCRIPTION

Figure 3:
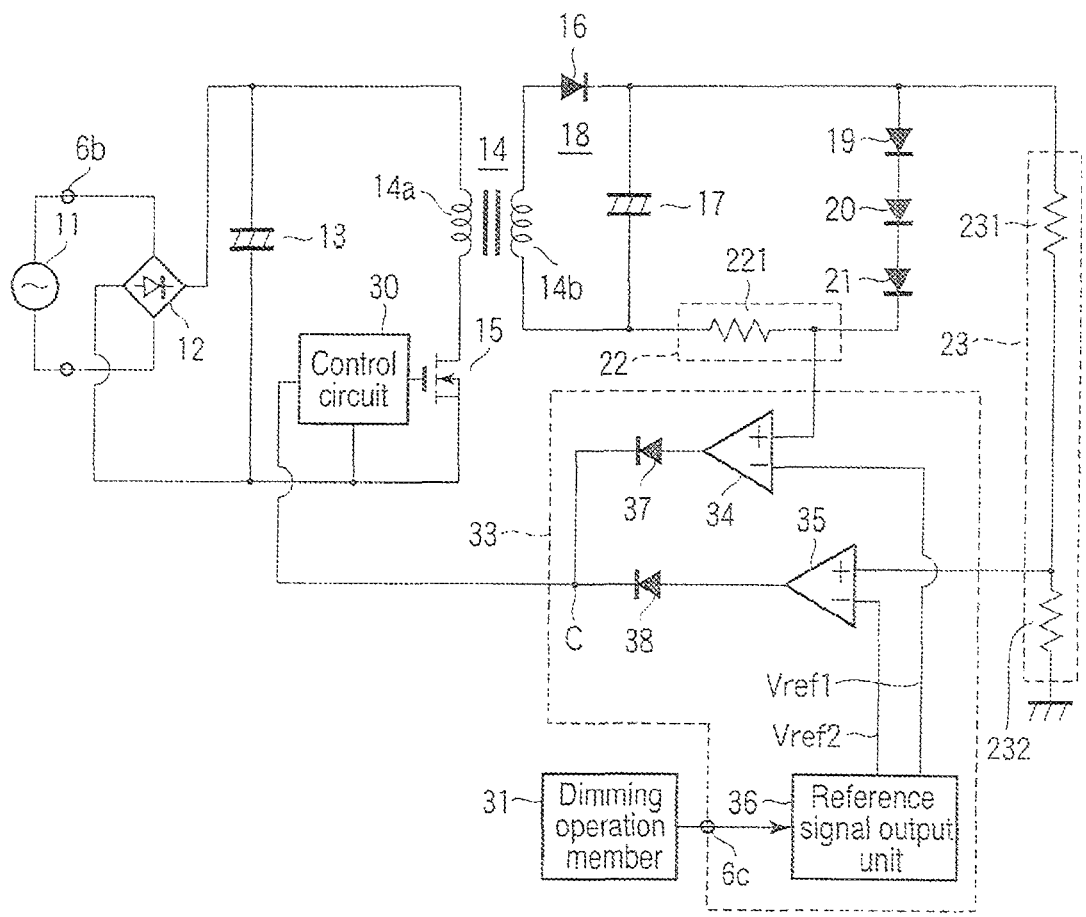
FIG. 3 is a schematic circuit diagram showing an electrical circuit of the power supply device shown in FIG. 1.

Embodiments of a lighting equipment including a power supply device which can implement dimming control will be described in detail hereinafter with reference to the drawings.

In general, according to one embodiment, a power supply device comprises a semiconductor light-emitting element, a current control circuit, a voltage control circuit, and a dimming controller. The current control circuit controls a current supplied to the semiconductor light-emitting element, and the voltage control circuit controls a voltage applied to the semiconductor light-emitting element. The dimming controller receives a dimming signal having a certain dimming depth, sets a current control mode and/or a voltage control mode according to the dimming depth. The dimming controller controls the current control circuit to drive the semiconductor light-emitting element at a target current specified depending on the dimming depth when the current control mode is set, and also controls the voltage control circuit to drive the semiconductor light-emitting element at a target voltage specified depending on the dimming depth when the voltage control mode is set.

(First Embodiment)

FIGS. 1 and 2 show a lighting equipment which incorporates a power supply device according to an embodiment. Referring to FIGS. 1 and 2, reference numeral 1 denotes an equipment main body. This equipment main body 1 is prepared by die-casting aluminum, and is formed into a nearly cylindrical shape having openings at two ends. The interior of this equipment main body 1 is partitioned into three spaces in a vertical direction by partition members 1a and 1b. In a lower space between a lower opening and the partition member 1a, a light source unit 2 is arranged. This light source unit 2 includes a plurality of LEDs 2a as semiconductor light-emitting elements and a reflector 2b for reflecting light rays from the LEDs 2a. The plurality of LEDs 2a are mounted in the lower space, and are allocated at equal intervals along a circumferential direction of a disk-shaped circuit board 2c arranged on the lower surface of the partition member 1a.

A hollow space between the partition members 1a and 1b of the equipment main body 1 is assigned to a power supply chamber 3. In this power supply chamber 3, a circuit board 3a is arranged on an upper portion of the partition member 1a. On this circuit board 3a, electronic components which configure a power supply device required to drive the plurality of LEDs 2a are arranged. This DC power supply device and the plurality of LEDs 2a are connected via lead wires 4.

A space between the partition member 1b and an upper opening of the equipment main body 1 is defined as a power supply terminal chamber 5. In this power supply terminal chamber 5, a power supply terminal block 6 is arranged on the partition member or plate 1b. This power supply terminal block 6 is a terminal block required to supply an AC power of a commercial power supply to the power supply device in the power supply chamber 3, and has outlets 6b as power supply terminals for a power supply cable, outlets 6c used as terminal portions for a feeder cable, a release button 6d used to release a power supply line and feeder line, and the like on two surfaces of a box 6a which is made up of an electrically insulating synthetic resin.

FIG. 3 is a circuit diagram of the power supply device according to the embodiment, which is incorporated in the power supply chamber 3 of the lighting equipment with the above arrangement.

Referring to FIG. 3, reference numeral 11 denotes an AC power supply as a commercial power supply outside the lighting equipment. This AC power supply 11 is connected to power supply terminals 6b of the lighting equipment shown in FIG. 2 via a lighting switch (not shown) outside the lighting equipment, and a full-wave rectifying circuit 12 is connected to the power supply terminals 6b. The full-wave rectifying circuit 12 outputs a rectified voltage obtained by full-wave rectifying an AC power from the AC power supply 11 upon an ON operation of the lighting switch. Between output terminals of the full-wave rectifying circuit 12, a smoothing capacitor 13 which smoothes a ripple current is connected in parallel. The full-wave rectifying circuit 12 and capacitor 13 form a DC power supply circuit, which is connected to a primary winding 14a of a switching transformer 14 as a flyback transformer.

To the primary winding 14a of the switching transformer 14 as a flyback transformer, a field effect transistor (FET) 15 as a switching element is connected in series. Between the two terminals of the smoothing capacitor 13, a series circuit of the primary winding 14a of the switching transformer 14 and FET 15 is connected. The switching transformer 14 has a secondary winding 14b which is magnetically coupled to the primary winding 14a.

To the secondary winding 14b of the switching transformer 14, a rectifying/smoothing circuit 18, which rectifies and smoothes a voltage generated at the secondary winding 14b, is connected. The rectifying/smoothing circuit 18 includes a diode 16 which is connected in series to the secondary winding 14b, and a smoothing capacitor 17 which is connected in parallel to the secondary winding 14b. This rectifying/smoothing circuit 18 forms a DC lighting circuit which generates a DC output required to light on light-emitting diodes together with the FET 15 and switching transformer 14.

In this DC lighting circuit, when the FET 15 is turned on and off in response to pulse signals having a certain ON duty ratio output from a control circuit 30, a DC voltage from the full-wave rectifying circuit 12 is converted into a rectangular wave voltage, which is applied to the primary winding 14a of the switching transformer 14. When this rectangular wave voltage appears at the primary winding 14a of the switching transformer 14, a boosted AC voltage is generated from the secondary winding 14b of the switching transformer 14. This AC voltage is rectified by the diode 16 in the rectifying/smoothing circuit 18, the rectified voltage is smoothed by the smoothing capacitor 17, and the smoothed voltage is output from the smoothing capacitor 17 as a DC output.

Between the two terminals of the smoothing capacitor 17 in the rectifying/smoothing circuit 18, a plurality of series-connected light-emitting diodes 19 to 21, for example, three series-connected light-emitting diodes 19 to 21 as semiconductor light-emitting elements are connected as loads. The light-emitting diodes 19 to 21 correspond to the LEDs 2a as light sources shown in FIG. 1. The series-connected light-emitting diodes 19 to 21 are dimmed and lighted on when they are supplied with a DC current according to a certain DC voltage output from the rectifying/smoothing circuit 18. That is, when the FET 15 is turned on and off in response to switching pulses having a high ON duty ratio, an AC voltage, which is boosted to a relatively high level, appears from the secondary winding 14b of the switching transformer 14, a relatively high DC voltage is applied from the rectifying/ smoothing circuit 18 to the light-emitting diodes 19 to 21, and a constant current is supplied to the light-emitting diodes 19 to 21 to light them on at a certain luminance level. When the FET 15 is turned on and off in response to switching pulses having a low ON duty ratio, an AC voltage, which is boosted to a relatively low level, appears from the secondary winding 14b of the switching transformer 14, and a relatively high DC voltage is applied from the rectifying/smoothing circuit to the light-emitting diodes 19 to 21, thus dimming and lighting on the light-emitting diodes 19 to 21.

To a series circuit of the light-emitting diodes 19 to 21, a current detection circuit 22 is connected in series. This current detection circuit 22 includes a resistor 221 as an impedance element. In order to detect a current flowing through the light-emitting diodes 19 to 21, a series circuit of the light-emitting diodes 19 to 21 and the resistor 221 is connected in parallel to the smoothing capacitor 17, and a current detection value I is output from a node between the series circuit of the light-emitting diodes 19 to 21 and the resistor 221 as a detection signal. To the anode side of the series circuit of the light-emitting diodes 19 to 21, a load voltage detection circuit 23 is connected, and the anode side is grounded via this load voltage detection circuit 23. This load voltage detection circuit 23 includes a series circuit of resistors 231 and 232 as impedance elements, detects a load voltage applied to the series circuit of the light-emitting diodes 19 to 21, i.e., a voltage on the anode side of the light-emitting diode 19, and outputs this load voltage V as a detection signal.

To the current detection circuit 22 and load voltage detection circuit 23, a dimming controller 33 as a dimming control circuit is connected. The dimming controller 33 includes comparator 34 and 35, and a reference signal output unit 36. An inverting input terminal of the comparator 34 is connected to the node between the series circuit of the light-emitting diodes 19 to 21 and the current detection circuit 22, and a non-inverting input terminal thereof is connected to the reference signal output unit 36. The comparator 34 compares a detection signal (current detection value I) of the current detection circuit 22 and a reference signal Vref1 of the reference signal output unit 36, and outputs a comparison result. An inverting input terminal of the comparator 35 is connected to the node between the resistors 231 and 232, and a non-inverting input terminal thereof is connected to the reference signal output unit 36. The comparator 35 compares a detection signal (load voltage V) of the load voltage detection circuit 23 and a reference signal Vref2 of the reference signal output unit 36, and outputs a comparison result. These comparators 34 and 35 are respectively connected to diodes 37 and 38, and are connected to the control circuit 30 via a common node C on the cathode side of the diodes 37 and 38. The diodes 37 and 38 form an OR circuit. At the node C between these diodes 37 and 38, a larger one of the reference signals Vref1 and Vref2 appears, and is output to the control circuit 30 as a control signal Vcont.

The control circuit 30 controls the FET 15 to be turned on and off by an operation according to the control signal Vcont so as to switching-drive the switching transformer 14, thereby controlling an output to be supplied to the light-emitting diodes 19 to 21. The control circuit 30 is configured by a switching pulse generation circuit whose ON duty ratio is specified according to the level of the control signal Vcont. For example, the control circuit 30 includes a memory which is referred to by the control signal Vcont, an arithmetic circuit which generates pulse signals at an ON duty ratio stored in this memory, and an amplifier which amplifies pulses output from this arithmetic circuit.

The reference signal output unit 36 is connected to a dimming operation member 31 arranged on, e.g., a wall surface outside the lighting equipment via a terminal 6c (corresponding to the outlet 6c), and receives a dimming signal k from the dimming operation member 31. The dimming signal k from the dimming operation member 31 has, for example, levels of dimming depths k1 to k7. In this case, the dimming depth k1 is shallowest. In other words, the light-emitting diodes are dimmed to be brightest at the dimming depth k1. The light-emitting diodes are dimmed to be deeper toward the dimming depth k7, i.e., to be darker according to the value of the dimming depth k. At the dimming depth k7, the light-emitting diodes are dimmed to be darkest.

Figure 4:
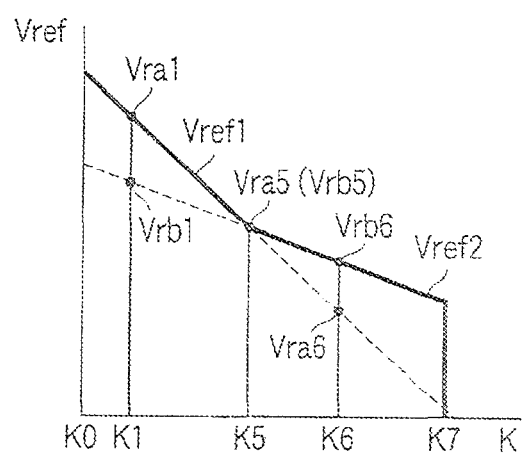
FIG. 4 is a graph showing reference signals Vref1 and Vref2 generated from a reference signal output unit shown in FIG. 3.

The reference signal output unit 36 outputs reference signals Vref1 and Vref2, which are selected from lines of the reference signals Vref1 and Vref2, as shown in FIG. 4, in accordance with the input dimming signal k. More specifically, the reference signal output unit 36 includes a memory which is referred to by the level of the dimming signal k, and a processor which searches the memory using the level of the dimming signal k, and outputs Vref1 and the reference signal Vref2 according to the dimming signal k. The line of the reference signal Vref1 represents a change from a reference signal value corresponding to a maximum current in a full lighting state when the dimming depth is shallowest (dimming depth k1) to that corresponding to a minimum current when the dimming depth is deepest (in case of the dimming depth k7). The line of the reference signal Vref2 represents a change from a reference signal value corresponding to a load voltage at the time of a maximum current in a full lighting state when the dimming depth is shallowest (dimming depth k1) to that corresponding to a load voltage at the time of a minimum current when the dimming depth is deepest (in case of the dimming depth k7).

Figure 6:
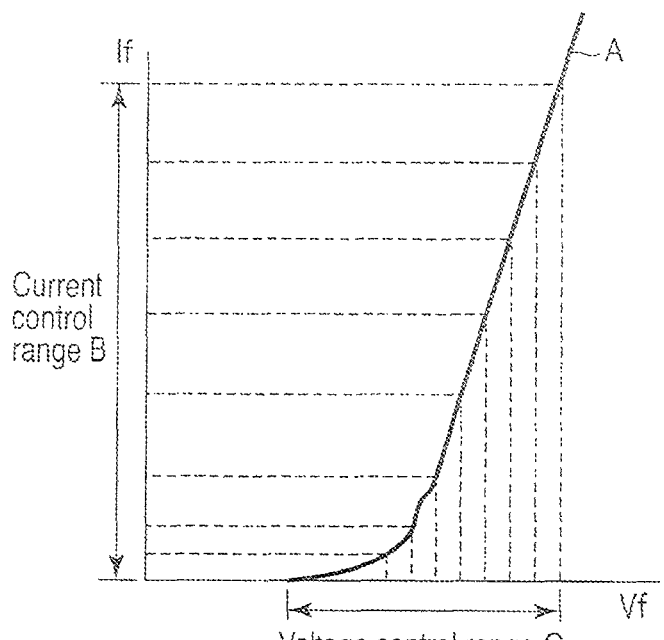
FIG. 6 is a graph showing the V-I characteristics of each light-emitting diode shown in FIG. 3.

Even when the light-emitting diodes 19 to 21 transit to a light-off state in which nearly no current flows, a certain load voltage can be applied to the light-emitting diodes 19 to 21, and the reference signal value of the reference signal Vref2 is not set to be zero but a certain value. FIG. 6 is a graph showing the V-I characteristics of each light-emitting diode shown in FIG. 3. The light-emitting diodes 19 to 21 have a current control range B and voltage control range C. as shown in FIG. 6, and these ranges have a relationship of light-emitting diode V-I characteristics A between them. As can be seen from the light-emitting diode V-I characteristics A, even when a current value If lowers to nearly zero in the current control range B, a certain voltage Vf can be applied in the voltage control range C, and this means that even when the reference signal Vref1 reaches nearly zero, the reference signal Vref2 does not become zero.

Figure 5:
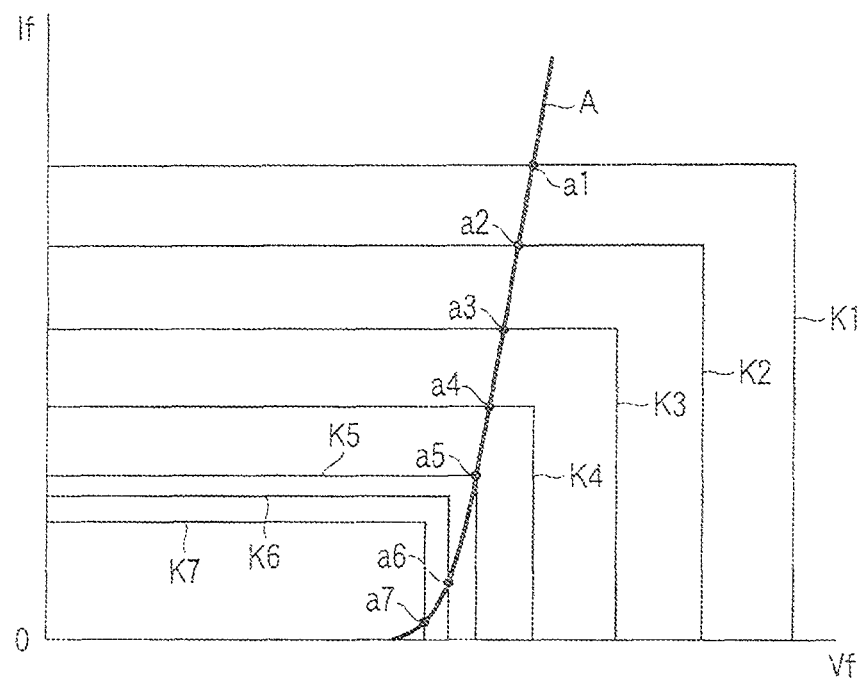
FIG. 5 is a graph showing the relationship between V-I characteristics of each light-emitting diode shown in FIG. 3 and load characteristics specified by a dimming signal.

FIG. 5 shows the relationship between the dimming depths K1 to K7 to be set and the light-emitting diode V-I characteristics A. The power supply device is operated based on different load characteristics according to the dimming depths k1, k2, ... , k7 of the dimming signal k shown in FIG. 5. That is, at the dimming depths k1 to k4, the power supply device is controlled in a current control mode so as to give load characteristics at operation points a1 to a4 corresponding to intersections between the dimming depths k1 to k4 and the V-I characteristics A to the power supply device. In the current control mode, even when the voltage Vf is changed within a range of the operation points a1 to a4, the current If is controlled to be a certain constant target current. An operation point a5 corresponding to an intersection between the dimming depth k5 and the V-I characteristics A is a critical point, and the current and voltage of the power supply device are controlled based on the operation point a5. At the dimming depths k6 and k7, the power supply device is controlled in a voltage control mode so as to give load characteristics at operation points a6 and a7 corresponding to intersections between the dimming depths k6 and k7 and the V-I characteristics A to the power supply device. In the voltage control mode, even when the current If is changed within a range of the operation points a6 and a7, the voltage Vf is controlled to a certain target predetermined voltage.

The reference signals Vref1 and Vref2 are set as follows in response to the settings of dimming depth K1 to K7, and the control circuit 30 controls the rectifying/smoothing circuit 18 to set a current or voltage output to be supplied to the light-emitting diodes 19 to 21 to be a constant target current or target voltage by controlling the ON/OFF operations of the switching transistor 15 based on the outputs from the comparators 34 and 35 according to the set reference signals Vref1 and Vref2. That is, in the current control mode, the control circuit 30 controls the rectifying/smoothing circuit 18 so that a current supplied to the light-emitting diodes 19 to 21 reaches a predetermined target current value. In the voltage control mode, the control circuit 30 controls the rectifying/smoothing circuit 18 so that a voltage supplied to the light-emitting diodes 19 to 21 reaches a predetermined target voltage value.

More specifically, when the dimming operation member 31 outputs the dimming signal k for a full lighting state, i.e., with the dimming depth k1, load characteristics corresponding to the dimming depth k1 shown in FIG. 5 are specified according to this dimming signal k, and the power supply circuit is operated based on the load characteristics. In this case, the load characteristics corresponding to the dimming depth k1 are specified to operate at the operation point a1 of the light-emitting diodes 19 to 21 corresponding to the intersection between the dimming depth k1 and the V-I characteristics A of the light-emitting diodes 19 to 21. The reference signal output unit 36 sets a value Vra1 as the reference signal Vref1 and a value Vrb1 as the reference signal Vref2 according to the dimming depth k1, as shown in FIG. 4, and outputs the reference signal Vref1 having the value Vra1 and the reference signal Vref2 having the value Vrb1. Therefore, the comparator 34 outputs a comparison result between the detection signal (current detection value I) of the current detection circuit 22 and the reference signal Vra1 of the reference signal output unit 36. Also, the comparator 35 outputs a comparison result between the detection signal (load voltage V) of the load voltage detection circuit 23 and the reference signal Vrb1 of the reference signal output unit 36. Since the reference signals satisfy a relation Vra1>Vrb1, the output from the comparator 34 is preferentially supplied to the control circuit 30 at the node between the diodes 37 and 38. As a result, the ON/OFF operations of the switching transistor 15 are controlled based on the detection signal (current detection value of the current detection circuit 22 so that a current flowing through the light-emitting diodes 19 to 21 becomes constant.

Next, upon operation of the dimming operation member 31, when the dimming signal k with, e.g., the dimming depth k5 is output, load characteristics corresponding to the dimming depth k5 shown in FIG. 5 are specified. The load characteristics corresponding to the dimming depth k5 are specified to operate at the operation point a5 of the light-emitting diodes 19 to 21 corresponding to the intersection with the V-I characteristics A of the light-emitting diodes 19 to 21. The reference signal output unit 36 sets a value Vra5 as the reference signal Vref1 and a value Vrb5 as the reference signal Vref2 according to the setting of the dimming depth k5, as shown in FIG. 4, and outputs the reference signal Vref1 having the value Vra5 and the reference signal Vref2 having the value Vrb5. Therefore, the comparator 34 outputs a comparison result between the detection signal (current detection value I) of the current detection circuit 22 and the reference signal Vra5 of the reference signal output unit 36. Also, the comparator 35 outputs a comparison result between the detection signal (load voltage V) of the load voltage detection circuit 23 and the reference signal Vrb5 of the reference signal output unit 36. Since the reference signals satisfy a relation Vra5=Vrb5, the outputs from the comparators 34 and 35 become equal to each other at the node between the diodes 37 and 38. As a result, the control circuit 30 controls the ON/OFF operations of the switching transistor 15 based on both the detection signal (current detection value I) of the current detection circuit 22 and the detection signal (load voltage V) of the load voltage detection circuit 23.

Next, when the dimming operation member 31 outputs the dimming signal k with, e.g., the dimming depth k6, load characteristics corresponding to the dimming depth k6 shown in FIG. 5 are specified. The load characteristics corresponding to the dimming depth k6 are specified to operate at the operation point a6 of the light-emitting diodes 19 to 21 corresponding to the intersection with the V-I characteristics A of the light-emitting diodes 19 to 21. The reference signal output unit 36 sets a value Vra6 as the reference signal Vref1 and a value Vrb6 as the reference signal Vref2 according to the setting of the dimming depth k6, as shown in FIG. 4, and outputs the reference signal Vref1 having the value Vra6 and the reference signal Vref2 having the value Vrb6. Therefore, the comparator 34 outputs a comparison result between the detection signal (current detection value I) of the current detection circuit 22 and the reference signal Vra6 of the reference signal output unit 36. Also, the comparator 35 outputs a comparison result between the detection signal (load voltage V) of the load voltage detection circuit 23 and the reference signal Vrb6 of the reference signal output unit 36. Since the reference signals satisfy a relation Vra1>Vrb1, the output from the comparator 35 is preferentially supplied to the control circuit 30 at the node between the diodes 37 and 38. As a result, the ON/OFF operations of the switching transistor 15 are controlled based on the detection signal (load voltage V) of the load voltage detection circuit 23 so that a load voltage of the light-emitting diodes 19 to 21 becomes constant.

As described above, the reference signal Vref1, which changes from a signal value corresponding to a maximum current in a full lighting state to that corresponding to a minimum current in case of the deepest dimming depth, and the reference signal Vref2, which changes from a signal value corresponding to a load voltage at the time of a maximum current in a full lighting state to that corresponding to a minimum current in case of the deepest dimming depth, are prepared in accordance with the dimming depths k1, k2, . . . , k7 of the dimming signal k. In a shallow dimming depth region close to a full lighting state, the reference signal Vref1 is selected to apply constant-current control to the light-emitting diodes 19 to 21 in the current control mode. In a deep dimming depth region, the reference signal Vref2 is selected to apply constant-voltage control to the light-emitting diodes 19 to 21 in the voltage control mode. According to such control, the constant-current control and constant-voltage control can be smoothly switched according to the dimming depths k1, k2, . . . , k7 of the dimming signal k. As a result, dimming control over a broad range from a shallow dimming depth region to a deep dimming depth region can be stably made. Since control for directly driving the light-emitting diodes 19 to 21 using a driving signal with a variable pulse width is not used in the dimming control of the light-emitting diodes 19 to 21, flickers can be prevented from being generated in light outputs from the light-emitting diodes compared to the dimming control based on a pulse width disclosed in JP-A 2003-157986 (Kokai). Also, since the need for, e.g., a switch element for the dimming control is obviated, the circuit arrangement can be simplified to reduce the number of components. As a result, a size reduction and price reduction of the device can be realized. Furthermore, a circuit efficiency drop can be suppressed.

(Second Embodiment)

A power supply device according to the second embodiment will be described below.

Figure 7:
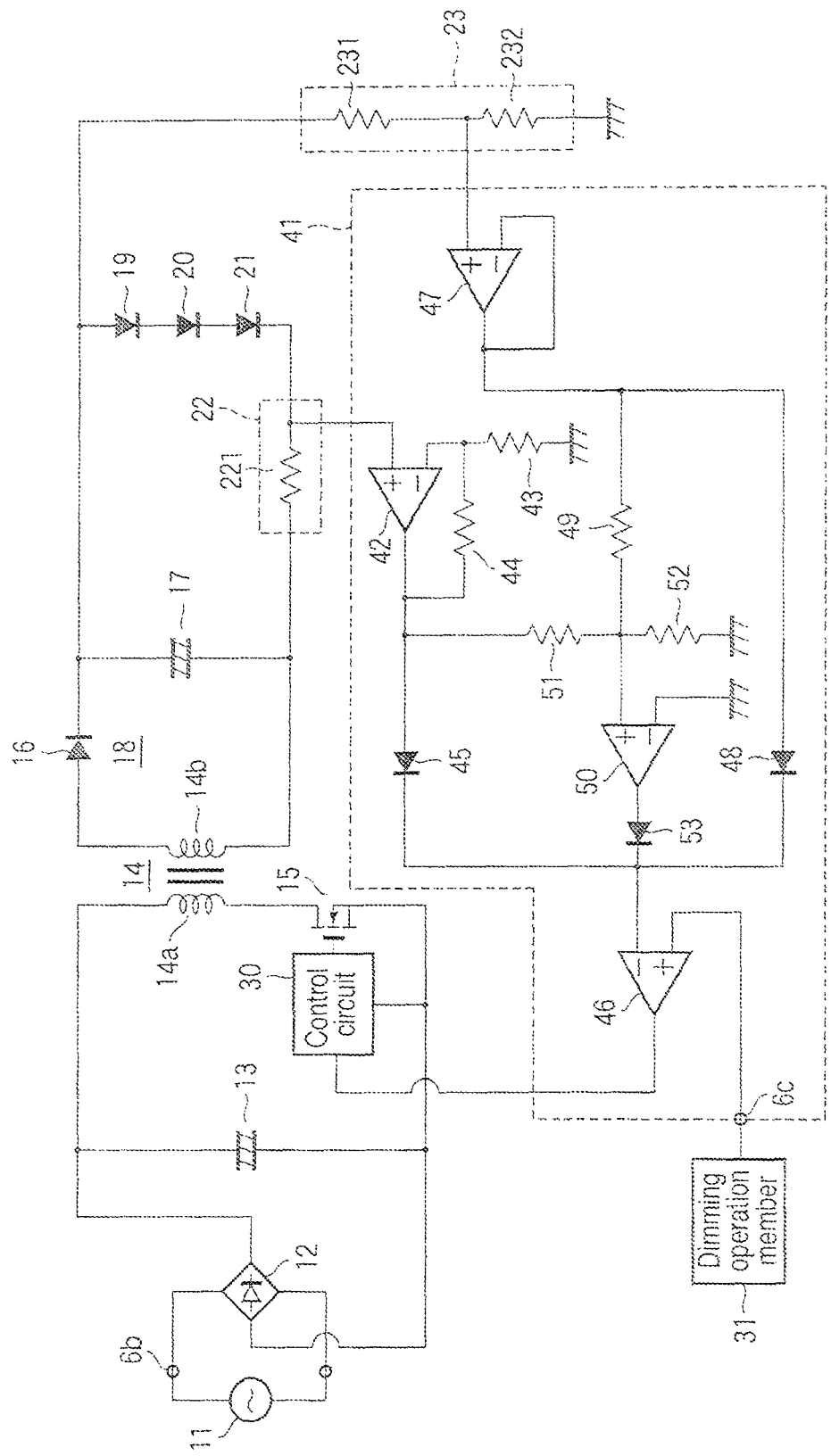
FIG. 7 is a schematic circuit diagram showing a power supply circuit of a power supply device according to the second embodiment.

FIG. 7 shows the circuit arrangement of the power supply device according to the second embodiment. In the following description, the same reference numerals denote the same parts as in FIG. 3, and a description thereof will not be repeated.

In the circuit shown in FIG. 7, a dimming controller 41 is connected to a current detection circuit 22 and load voltage detection circuit 23. In the dimming controller 41, a positive input terminal of a first operational amplifier 42 is connected to the current detection circuit 22. A negative input terminal of this first operational amplifier 42 is grounded via a resistor 43, and is connected to its output terminal via a resistor 44. The output terminal of the first operational amplifier 42 is connected to one input terminal of a comparator 46 via a diode 45. A positive input terminal of a second operational amplifier is connected to the load voltage detection circuit 23. A negative input terminal of this second operational amplifier 47 is connected to its output terminal, which is connected to one input, terminal of the comparator 46 via a diode 48. Furthermore, a positive input terminal of the third operational amplifier 50 is connected to the output terminal of the second operational amplifier 47. The positive input terminal of the third operational amplifier 50 is connected to a node of a series circuit of resistors 51 and 52, which are connected between the output terminal of the first operational amplifier 42 and ground, and its negative input terminal is grounded. Furthermore, the third operational amplifier 50 is connected to one input terminal of the comparator 46 via a diode 53. The comparator 46 receives a dimming signal k from a dimming operation member 31 at the other input terminal thereof, and inputs a comparison result of signals supplied to these input terminals to a control circuit 30.

Figure 8:
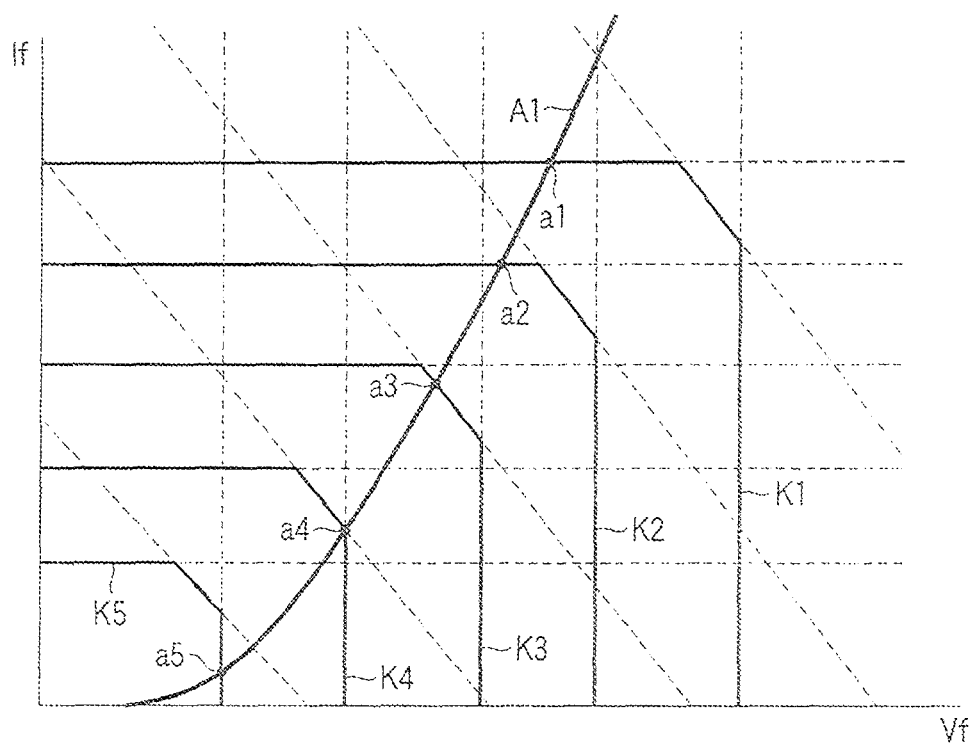
FIG. 8 is a graph showing the relationship between V-I characteristics of each light-emitting diode shown in FIG. 7 and load characteristics specified by a dimming signal.

In such circuit, when the dimming signal k is input from the dimming operation member 31, load characteristics are specified, as shown in FIG. 8, in accordance with dimming depths k1 to k5 at that time. FIG. 8 shows the relationship between the load characteristics corresponding to the dimming depths k1, k2, . . . , k5, and V-I characteristics A of light-emitting diodes 19 to 21.

When the dimming signal k for a full lighting state, e.g., with the dimming depth k1 is input upon operation of the dimming operation member 31, load characteristics corresponding to the dimming depth k1 shown in FIG. 8 are specified according to this dimming signal k. The load characteristics corresponding to the dimming depth k1 are specified at an operation point a1 of the light-emitting diodes 19 to 21 corresponding to an intersection between the dimming depth k1 and the V-I characteristics A of the light-emitting diodes 19 to 21. At this operation point a1, the output from the first operational amplifier 42 according to a detection signal (current detection value I) of the current detection circuit 22 is input to the comparator 46, and the light-emitting diodes 19 to 21 are drive-controlled under constant-current control.

Next, when the dimming signal k with the dimming depth k5 is input by the dimming operation member 31, load characteristics corresponding to the dimming depth k5 shown in FIG. 8 are specified according to this dimming signal k. The load characteristics corresponding to the dimming depth k5 are specified at an operation point a5 of the light-emitting diodes to 21 corresponding to an intersection between the dimming depth k5 and the V-I characteristics A of the light-emitting diodes 19 to 21. At this operation point a5, the output from the second operational amplifier 47 according to a detection signal (load voltage V) of the load voltage detection circuit 23 is input to the comparator 46, and the light-emitting diodes 19 to 21 are drive-controlled by the control circuit 30 under constant-voltage control.

Next, when the dimming signal k with the dimming depth k3 is input by the dimming operation member 31, load characteristics corresponding to the dimming depth k3 shown in FIG. 8 are specified according to this dimming signal k. The load characteristics corresponding to the dimming depth k3 are specified at an operation point a3 of the light-emitting diodes to 21 corresponding to an intersection between the dimming depth k3 and the V-I characteristics A of the light-emitting diodes 19 to 21. At this operation point a3, the output from the third operational amplifier 50 according to a detection signal (current detection value I) of the current detection circuit 22 and a detection signal (load voltage V) of the load voltage detection circuit 23 is input to the comparator 46, and the light-emitting diodes 19 to 21 are drive-controlled by the control circuit 30 under power control.

With the aforementioned control, even when an operation point of the light-emitting diodes 19 to 21 is located at an intermediate position between the current control mode and voltage control mode, the light-emitting diodes 19 to 21 are power-controlled based on the output from the third operational amplifier 50 according to a detection signal (current detection value I) of the current detection circuit 22 and a detection signal (load voltage V) of the load voltage detection circuit 23. Therefore, the control can be smoothly transited between the current control mode and voltage control mode.

(Third Embodiment)

A power supply device according to the third embodiment will be described below.

The power supply device according to the third embodiment will be described using FIG. 3.

Figure 10A:
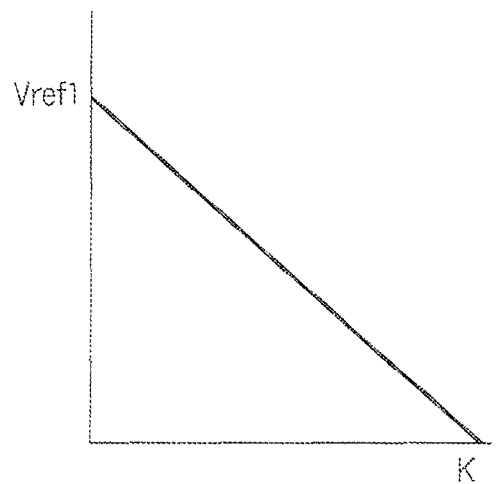
FIG. 10A is a graph for explaining a reference signal generated by the reference signal output unit shown in FIG. 9A.
Figure 10B:
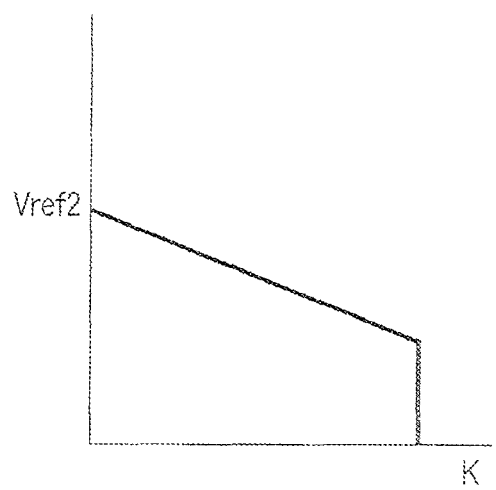
FIG. 10B is a graph for explaining another reference signal generated by the reference signal output unit shown in FIG. 9A.

In the first embodiment, a reference signal output unit 36 independently outputs reference signals Vref1 and Vref2. By contrast, in this third embodiment, the reference signals Vref1 and Vref2 are output as a single reference signal Vref. As shown in FIG. 9A, a first signal generator 55, which generates a reference signal Vref1 used in a region of a current control mode, and a second signal generator 56, which generates a reference signal Vref2 used in a region of a voltage control mode, are arranged. The reference signals Vref1 and Vref2 of these first and second signal generators 55 and 56 are output via diodes 57 and 58 and their nodes, and the reference signal Vref shown in FIG. 9B is output to comparators 34 and 35 as the reference signals Vref1 and Vref2 shown in FIG. 3. This reference signal Vref changes from a signal value corresponding to a maximum current in a full lighting state (a maximum value of the reference signal Vref1) to a signal value corresponding to a minimum current in case of a deepest dimming depth (a minimum value of the reference signal Vref1), as shown in FIG. 10A. The reference signal Vref2 in the region of the voltage control mode changes from a signal value corresponding to a load voltage at the time of a maximum current in a full lighting state to that corresponding to a minimum current in case of the deepest dimming depth, as shown in FIG. 10B. Even upon transition to a light-off mode in which a current ceases to flow, since an ON voltage of light-emitting diodes on an equivalent circuit remains, the reference signal Vref2 does not become zero. According to addition of the circuit shown in FIG. 9A, the reference signal Vref in each of the regions of the current control mode and voltage control mode is generated by preferentially using a larger signal of the reference signals Vref1 and Vref2, as shown in FIG. 9B, and this reference signal Vref can be supplied to the comparators 34 and 35 as a reference signal.

By adding the circuit shown in FIG. 9A in this way, the same effects as in the first embodiment can be obtained.

(Modification)

Figure 11A:
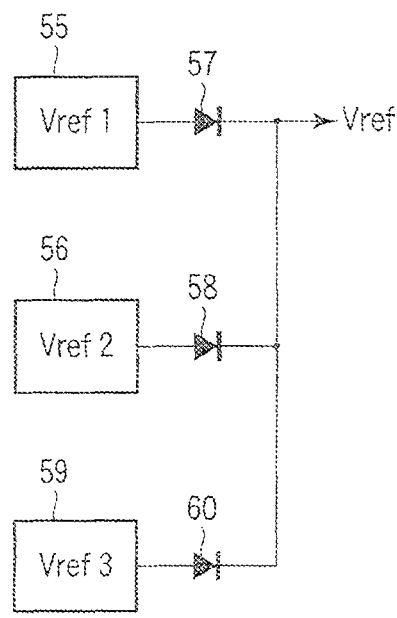
FIG. 11A is a circuit block diagram showing a reference signal output unit in a power supply circuit according to another modification of the power supply device shown in FIG. 7.
Figure 11B:
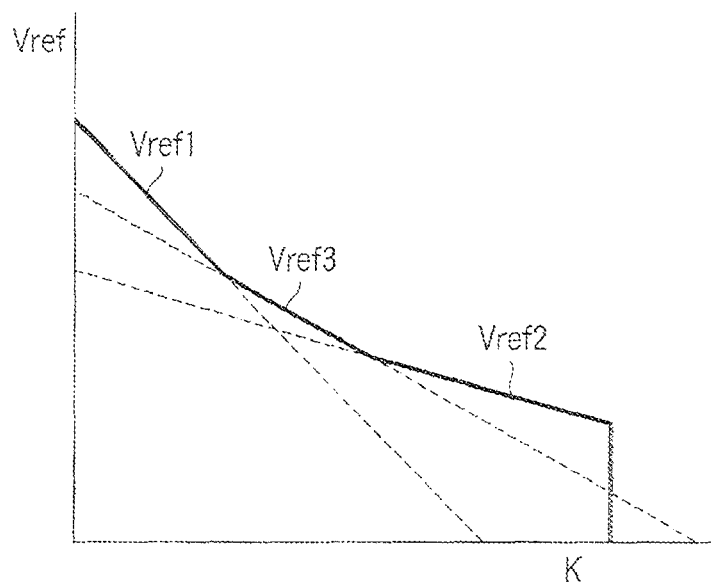
FIG. 11B is a graph for explaining reference signals output from the reference signal output unit shown in FIG. 11A.

In the above description, the reference signal Vref is generated by preferentially using a larger signal of the reference signals Vref1 and Vref2. In this case, the regions of the current control mode and voltage control mode cannot often be smoothly switched. In order to smoothly switch the regions of the current control mode and voltage control mode, a third signal generator 59, which generates a reference signal Vref3 having an intermediate gain between the reference signals Vref1 and Vref2, may be arranged in addition to the first and second signal generators 55 and 56, as shown in FIG. 11A. The reference signals Vref1, Vref2, and Vref3 of these first to third signal generators 55, 56, and 59 may be output to the comparators 34 and 35 as a reference signal Vref shown in FIG. 11B via diodes 57, 58, and 60 and their node. In this reference signal Vref, the reference signal Vref3, which shows an intermediate change of the gains of the reference signals Vref1 and Vref2 between the regions of the current control mode and voltage control mode, is included. Therefore, the control mode can be smoothly transited between the regions of the current control mode and voltage control mode.

(Fourth Embodiment)

A power supply circuit according to the fourth embodiment will be described below.

FIG. 12 schematically shows the circuit arrangement of a power supply device according to the fourth embodiment. In the following description, the same reference numerals in FIG. 12 denote the same parts as in FIG. 3, and a description thereof will not be repeated.

In the circuit shown in FIG. 12, a dimming controller 24 is connected to a current detection circuit 22 and load voltage detection circuit 23. The dimming controller 24 has a multiplier 26, adder 27, and comparator 28. The multiplier 26 outputs a signal as a product of a detection signal (load voltage v) of the load voltage detection circuit 23 and a dimming signal k from a dimming operation member 31. The adder 27 generates an output a as a sum of the output from the multiplier 26 and a detection signal (current detection value I) of the current detection circuit 22. The comparator 28 outputs a comparison result between the output a of the adder 27 and a reference value (constant) 29.

To the comparator 28, a control circuit 30 which forms control means together with the dimming controller 24 is connected. The control circuit 30 is driven by a power supply unit (not shown). The control circuit 30 turns on and off a switching transistor 15 by its operation to switching-drive a switching transformer 14, thereby controlling an output supplied from a rectifying/smoothing circuit 18 to light-emitting diodes 19 to 21. In this control, the control circuit 30 controls an output to be supplied to the light-emitting diodes 19 to 21, based on an output from the comparator 28 in the dimming controller 24, based on a value a obtained as a sum of the product of the detection signal (load voltage V) of the load voltage detection circuit 23 and the dimming signal k, and the detection signal (current detection value I) of the current detection circuit 22, so that this value a always becomes constant.

The dimming operation member 31 outputs the dimming signal k having a different dimming depth by changing, for example, a duty ratio of a pulse-shaped signal. In this embodiment, the dimming operation member 31 outputs the dimming signal k having dimming depths k1, k2, . . . , k7 (the dimming depth k1 is shallowest, and the depth becomes deeper toward the dimming depth k7).

Figure 13:
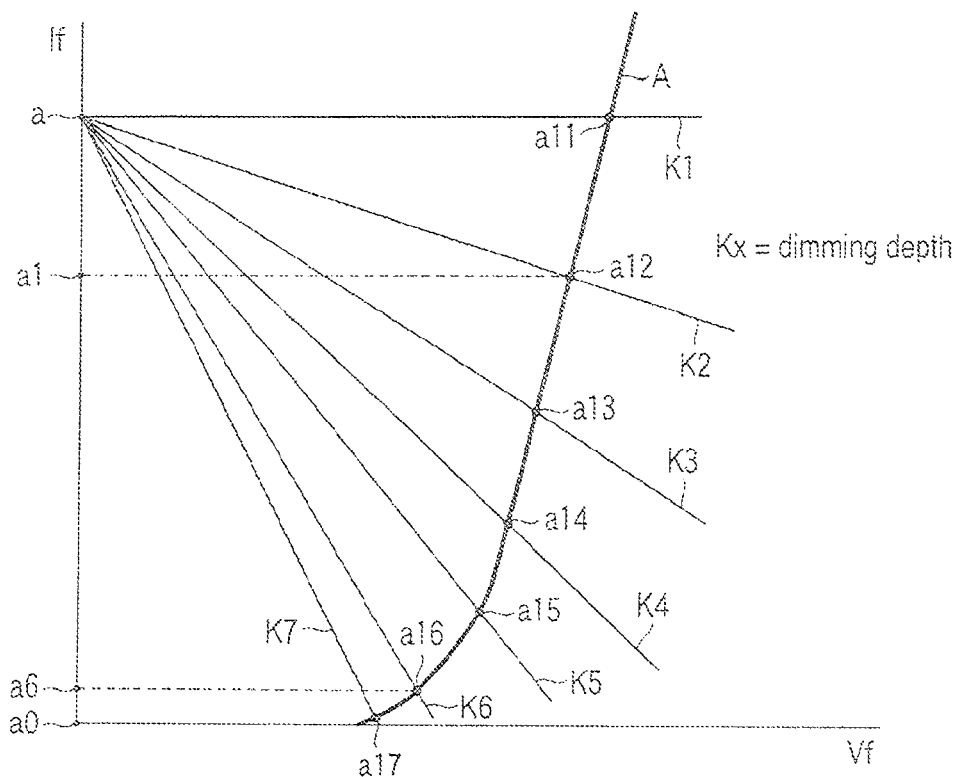
FIG. 13 is a graph showing load characteristics of the power supply device shown in FIG. 12.

In the circuit shown in FIG. 12, as the power supply device, different load characteristics can be obtained according to the dimming depths k1, k2, . . . , k7 of the dimming signal k, as shown in FIG. 13. In this case, the respective load characteristics corresponding to the dimming depths k1, k2, . . . , k7 are radially distributed to have a constant value a (a position of a load impedance=0) on a current axis as a center, and are expressed by a linear function If=a−k(Vf). In this way, a relationship given by If k(Vf)=a . . . (1), i.e., the relationship in which the sum of the current detection value I of the current detection circuit 22, and the product of the dimming signal k and load voltage v always becomes equal to the constant value a, is obtained.

The operation of the power supply circuit according to this embodiment with the above arrangement will be described below.

Assume that the load characteristics corresponding to the dimming depths k1, k2, . . . , k7 and V-I characteristics A of the light-emitting diodes 19 to 21 have the relationship shown in FIG. 13.

Initially, when the dimming operation member 31 outputs the dimming signal k for a full lighting state, e.g., with the dimming depth k1, the load characteristics corresponding to the dimming depth k1 shown in FIG. 13 are obtained according to this dimming signal k. The load characteristics corresponding to the dimming depth k1 are set at an operation point all of the light emitting diodes 19 to 21 corresponding to an intersection between the dimming depth k1 and the V-I characteristics A of the light-emitting diodes 19 to 21.

In this state, a switching transformer 14 is switching-driven by ON/OFF operations of the switching transistor 15 by the control circuit 30. In response to an ON operation of the switching transistor 15, a current is supplied to a primary winding 14a of the switching transformer 14 to accumulate an energy. In response to an OFF operation of the switching transistor 15, the energy accumulated on the primary winding 14a is discharged via a secondary winding 14b. In this manner, a DC output is generated via the rectifying/smoothing circuit 18, and the light-emitting diodes 19 to 21 are lighted on by this DC output.

In this case, the multiplier 26 calculates a product of the detection signal (load voltage V) of the load voltage detection circuit 23 and the dimming signal k, and the adder 27 calculates a sum of the output from this multiplier 26 and the detection signal (current detection value I) of the current detection circuit 22, thereby generating an output a. The comparator 28 then outputs a comparison result between this output a and the reference value (constant) 29. Based on this output, the control circuit 30 controls an output to be supplied to the light-emitting diodes 19 to 21, so that the output a always becomes equal to the constant value.

With this control, at the operation point a11 shown in FIG. 13, a k(Vf) component which determines a in equation (1) above is nearly zero, and a is determined by only an If component (see (a0-a) in FIG. 13). In this manner, the light-emitting diodes 19 to 21 undergo lighting control while emphasizing a current control mode.

Next, when the dimming operation member 31 outputs the dimming signal k corresponding to, e.g., the dimming depth k2, the load characteristics corresponding to the dimming depth k2 shown in FIG. 13 are obtained according to the dimming signal k at that time. Then, an intersection between the load characteristics corresponding to the dimming depth k2 and the V-I characteristics A of the light-emitting diodes 19 to 21 is set as an operation point a12.

In this case as well, the light-emitting diodes 19 to 21 are lighted on by ON/OFF operations of the switching transistor 15 by the control circuit 30 in the same manner as described above. At the operation point a12 shown in FIG. 13, the k(Vf) component which determines a in equation (1) above is (a-a1) shown in FIG. 13, and the If component is (a0-a1) shown in FIG. 13. In this case, the If component also accounts for a large share. Then, the light-emitting diodes 19 to 21 undergo lighting control while emphasizing the current control mode.

After that, when the dimming operation member 31 outputs the dimming signal k for a deep dimming depth, e.g., the dimming depth k6, the load characteristics corresponding to the dimming depth k6 shown in FIG. 13 are obtained according to the dimming signal k at that time. Then, an intersection between the load characteristics corresponding to the dimming depth k6 and the V-I characteristics A of the light-emitting diodes 19 to 21 is set as an operation point a16.

In this case as well, the light-emitting diodes 19 to 21 are lighted on by ON/OFF operations of the switching transistor by the control circuit 30 in the same manner as described above. At the operation point a16 shown in FIG. 13, the k(Vf) component which determines a in equation (1) above is (a-a6) shown in FIG. 13, and the If component is (a0-a6) shown in FIG. 13. In this state, the If component is fractional, and a is determined by the k(Vf) component which accounts for a large share. Then, the light-emitting diodes 19 to 21 undergo lighting control while emphasizing a voltage control mode.

Only the operation points a11, a12, and a16 have been described. The same applies to other operation points a13 to 15 and a17.

Therefore, with this control, when the dimming depth is adjusted within a range of k1, k2, ..., k7 by the dimming signal k, the light-emitting diodes 19 to 21 undergo lighting control by setting the current control mode in a shallow dimming depth region close to a full lighting state based on the load characteristics according to these dimming depths k1, k2, ..., k7. As the dimming depth becomes deeper, the control mode gradually transits from the current control mode to the voltage control mode to apply lighting control of the light-emitting diodes 19 to 21. In this way, dimming control methods based on the current control mode and voltage control mode can be smoothly transited according to the dimming depths of the dimming signal, and dimming control over a broad range from a shallow dimming depth region to a deep dimming depth region can be stably attained. Since no pulse-width control is used in the dimming control, flickers can be prevented from being generated in light outputs from the light-emitting diodes compared to the direct dimming control based on a pulse width disclosed JP-A 2003-157986 (KO-KAI). Also, since the need for, e.g., a switch element for the dimming control is obviated, the circuit arrangement can be simplified to reduce the number of components. As a result, a size reduction and price reduction of the device can be realized. Furthermore, a circuit efficiency drop can be suppressed.

Figure 14:
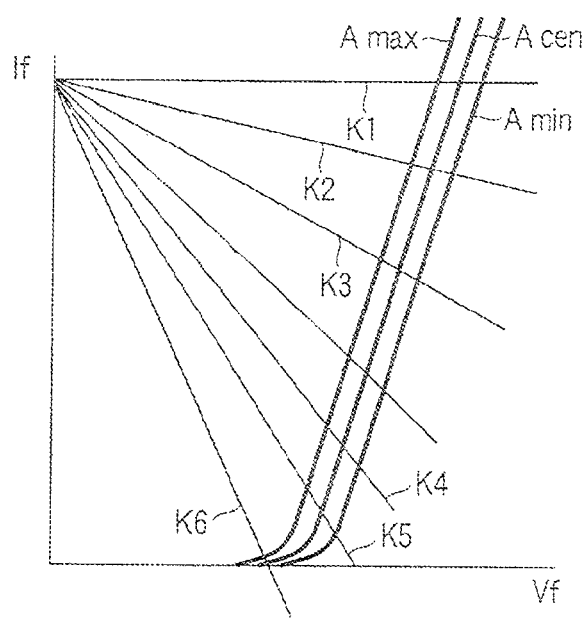
FIG. 14 is a graph showing V-I characteristics of each light-emitting diode shown in FIG. 12.
Figure 15A:
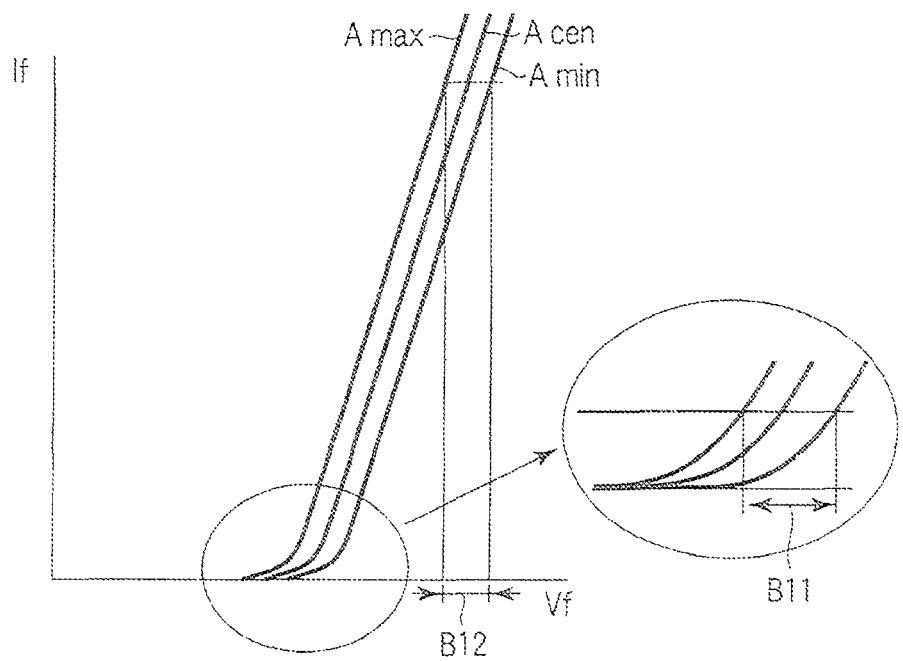
FIG. 15A is a graph for explaining a variation range of each light-emitting diode shown in FIG. 12.
Figure 15B:
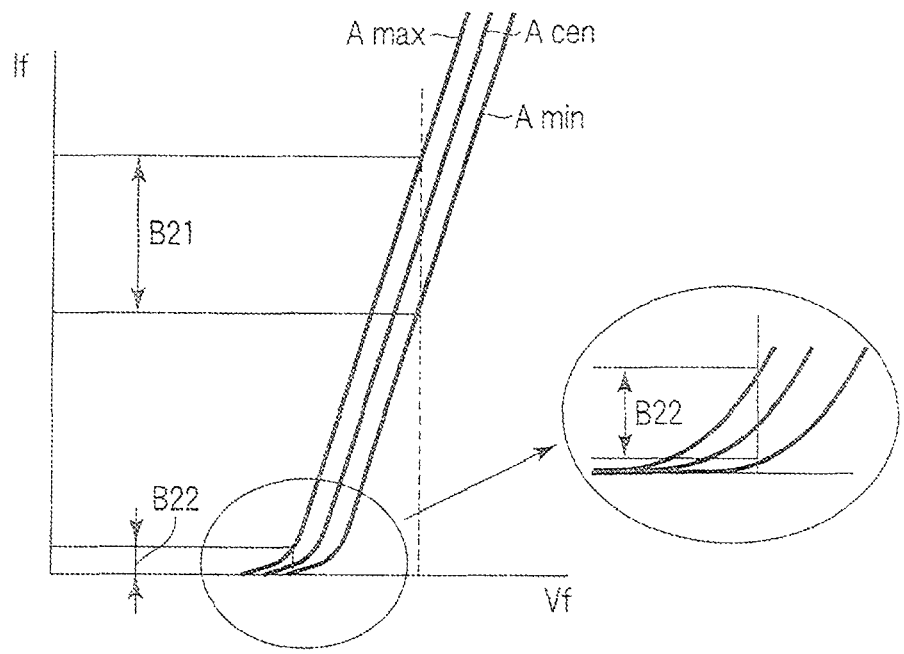
FIG. 15B is a graph for explaining a variation range of each light-emitting diode shown in FIG. 12.

As is known, the V-I characteristics A of the light-emitting diodes 19 to 21 have an exponentially rising region, and vary between Amax and Amin to have Acen as the center due to variations of elements and those of operation points caused by temperature characteristics, as shown in FIG. 14. In this case, in a shallow dimming depth region in which a relatively large current flows, the current control mode is selected, as described above. Hence, a variation B12 in a region with large ΔI/ΔV can be reduced with respect to a variation 311 in a region with small ΔI/ΔV, as shown in FIG. 15A. In a deep dimming depth region in which a small current flows, the voltage control mode is selected, as described above. Hence, a variation B22 in a region with small ΔI/ΔV can be reduced with respect to a variation 321 in a region with large ΔI/ΔV, as shown in FIG. 15B. In this way, variations of light outputs caused by variations of the light-emitting diodes 19 to 21 and those of operation points due to temperature characteristics can be suppressed as much as possible.

Note that the present invention is not limited to the aforementioned embodiments, and various modifications may be made without departing from the scope of the invention when it is practiced. For example, in the aforementioned embodiments, an analog circuit has been exemplified. However, a control method using a microcomputer and digital processing may be adopted. A switching mode of the dimming depth includes a continuous dimming mode and step-by-step dimming mode, and phase control that varies an effective voltage to loads by controlling a conduction period of a power supply voltage may be adopted. Furthermore, the dimming signal may use a dedicated signal line, and a power line Signal obtained by superposing the dimming signal on a power supply line may be used.

According to the embodiment, by only selecting the reference signal according to the dimming depth of the dimming signal, the current control mode and voltage control mode can be easily switched.

According to the embodiment, smooth control transition is allowed between the current control mode and voltage control mode.

According to the embodiment, the dimming control methods in which the current control mode and voltage control mode are emphasized can be smoothly switched by only changing the dimming depth, and dimming control over a broad range from a shallow dimming depth region to a deep dimming depth region can be stably attained.

According to the embodiment, variations of light outputs caused by variations of semiconductor light-emitting elements and those of operation points due to temperature characteristics can be suppressed.

According to the embodiment, a lighting equipment which can implement stable dimming control can be provided, and a power supply device and lighting equipment which can implement stable dimming control can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended, to cover such forms or modifications as would fall within the scope and spirit of the inventions.

What is claimed is:

1. A power supply device comprising:
   a semiconductor light-emitting element;
   a current detection circuit configured to detect a current supplied to the semiconductor light-emitting element and output a current detection signal;
   a voltage detection circuit configured to detect a voltage applied to the semiconductor light-emitting element and output a voltage detection signal;
   a dimming controller configured to receive a dimming signal indicating one of a plurality of dimming depths, output a first reference signal having a level determined in accordance with the dimming depth of the dimming signal, and output a second reference signal having a level determined in accordance with the dimming depth of the dimming signal, and
   a control circuit configured to:
   when the first reference signal is higher than the second reference signal, receive a comparison result between the first reference signal and the current detection signal and set a current control mode to control electrical power supplied to the semiconductor light-emitting element, and
   when the first reference signal is lower than the second reference signal, receive a comparison result between the second reference signal and the voltage detection signal and set a voltage control mode to control electrical power supplied to the semiconductor light-emitting element, wherein:
   when the control circuit sets the current control mode, the control circuit determines a target current based on the dimming depth to control a direct electrical current, which is continuously supplied to the semiconductor light-emitting element, in such a manner that the direct electrical current is kept at the target current, and
   when the control circuit sets the voltage control mode, the control circuit determines a target voltage to control a load voltage applied to the semiconductor light-emitting element in such a manner that the load voltage is kept at the target voltage.

2. The power supply device according to claim 1, wherein:
   the first reference signal is utilized to control the direct electrical current at the target current; and
   the second reference signal is utilized to control the load voltage at the target voltage.

3. The power supply device according to claim 2, wherein the control circuit includes a power control module configured to control the electrical power supplied to the semiconductor light-emitting element based on the current supplied to the semiconductor light-emitting element and the load voltage applied to the semiconductor light-emitting element in an intermediate region which is defined between a constant-current control region in which the current control mode is performed and a constant-voltage control region in which the voltage control mode is performed.

4. A lighting equipment comprising:
   a power supply device according to claim 3, and
   an equipment body having the power supply device.

5. A lighting equipment comprising:
   a power supply device according to claim 2, and
   an equipment body having the power supply device.

6. The power supply device according to claim 1, wherein the control circuit includes a power control module configured to control the electrical power supplied to the semiconductor light-emitting element based on the current supplied to the semiconductor light-emitting element and the load voltage applied to the semiconductor light-emitting element in an intermediate region which is defined between a constant-current control region in which the current control mode is performed and a constant-voltage control region in which the voltage control mode is performed.

7. A lighting equipment comprising:
   a power supply device according to claim 6, and
   an equipment body having the power supply device.

8. A lighting equipment comprising:
   a power supply device according to claim 1, and
   an equipment body having the power supply device.

* * * * *